United States Patent
Lee et al.

(10) Patent No.: US 9,655,126 B2
(45) Date of Patent: May 16, 2017

(54) RESOURCE ALLOCATION METHOD AND RESOURCE MANAGEMENT APPARATUS FOR PERFORMING THE SAME

(71) Applicant: KT CORPORATION, Gyeonggi-do (KR)

(72) Inventors: Ki-Ho Lee, Gyeonggi-do (KR); Yong-Gyoo Lee, Seoul (KR); Yung-Ha Ji, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 91 days.

(21) Appl. No.: 14/434,698

(22) PCT Filed: Jul. 26, 2013

(86) PCT No.: PCT/KR2013/006724
§ 371 (c)(1),
(2) Date: Apr. 9, 2015

(87) PCT Pub. No.: WO2014/058143
PCT Pub. Date: Apr. 17, 2014

(65) Prior Publication Data
US 2015/0289278 A1    Oct. 8, 2015

(30) Foreign Application Priority Data

Oct. 10, 2012 (KR) ................. 10-2012-0112627

(51) Int. Cl.
*H04W 72/04* (2009.01)
*H04W 16/04* (2009.01)
(Continued)

(52) U.S. Cl.
CPC ....... *H04W 72/0486* (2013.01); *H04L 1/0005* (2013.01); *H04L 1/0057* (2013.01);
(Continued)

(58) Field of Classification Search
None
See application file for complete search history.

(56) References Cited

U.S. PATENT DOCUMENTS 7,158,796 B2   1/2007   Tiedemann, Jr. et al.
7,197,319 B2   3/2007   Tiedemann, Jr. et al.
(Continued)

FOREIGN PATENT DOCUMENTS

KR   10-2006-0021384 A   3/2006
KR   10-2007-0068465 A   6/2007
(Continued)

*Primary Examiner* — Paul H Masur
*Assistant Examiner* — Michael Phillips
(74) *Attorney, Agent, or Firm* — IP Legal Services, LLC (57) ABSTRACT

A resource management apparatus for managing a plurality of base stations (BSs) includes a load information management unit configured to manage load information of the plurality of BSs, a neighbor BS list management unit configured to manage a neighbor BS list of each BS, and a resource allocation unit. The resource allocation unit is configured to vary quantity of resources allocated to a target BS from among the plurality of BSs based on load information of the target BS and at least one neighbor BS of the target BS, upon reception of a resource allocation request from the target BS.

16 Claims, 5 Drawing Sheets

(51) Int. Cl.
    *H04L 1/00*     (2006.01)
    *H04L 1/18*     (2006.01)
    *H04W 24/02*    (2009.01)

(52) U.S. Cl.
    CPC ........... *H04L 1/1812* (2013.01); *H04W 16/04*
                     (2013.01); *H04W 24/02* (2013.01)

(56) References Cited

U.S. PATENT DOCUMENTS

| | | |
|---|---|---|
| 7,292,825 B2 | 11/2007 | Beale et al. |
| 7,680,500 B2 | 3/2010 | Tiedemann, Jr. et al. |
| 7,979,078 B2 | 7/2011 | Tiedemann, Jr. et al. |
| 8,000,717 B2 | 8/2011 | Tiedemann, Jr. et al. |
| 8,107,426 B2 | 1/2012 | Cho et al. |
| 8,477,628 B2 | 7/2013 | Ishii |
| 8,533,553 B2 | 9/2013 | Yang et al. |
| 8,559,966 B2 | 10/2013 | Bernini et al. |
| 2008/0276148 A1* | 11/2008 | Lohr ................... H04L 1/1819 714/750 |
| 2009/0069025 A1 | 3/2009 | Pischella |
| 2010/0248730 A1 | 9/2010 | Han et al. |
| 2011/0092220 A1* | 4/2011 | Bernini ................ H04W 16/04 455/452.2 |
| 2012/0093105 A1 | 4/2012 | Park et al. |
| 2012/0099546 A1 | 4/2012 | Cho et al. |
| 2012/0214529 A1 | 8/2012 | Ohta et al. |
| 2013/0028093 A1* | 1/2013 | Cho ....................... H04W 28/08 370/236 |
| 2013/0230019 A1* | 9/2013 | Manssour ......... H04W 72/1226 370/330 |
| 2013/0288686 A1* | 10/2013 | Chou ............... H04N 21/2365 455/436 |

FOREIGN PATENT DOCUMENTS

| | | |
|---|---|---|
| KR | 10-2008-0065890 A | 7/2008 |
| KR | 10-2009-0008408 A | 1/2009 |
| KR | 10-2010-0130138 A | 12/2010 |
| KR | 10-2010-0139021 A | 12/2010 |
| KR | 10-2011-0015556 A | 2/2011 |
| KR | 10-2012-0039409 A | 4/2012 |

* cited by examiner

RESOURCE ALLOCATION METHOD AND RESOURCE MANAGEMENT APPARATUS FOR PERFORMING THE SAME

CROSS REFERENCE TO RELATED APPLICATIONS

This application is a National Stage Patent Application of PCT International Patent Application No. PCT/KR2013/006724 (filed on Jul. 26, 2013) under 35 U.S.C. §371, which claims priority to Korean Patent Application No. 10-2012-0112627 (filed on Oct. 10, 2012), the teachings of which are incorporated herein in their entireties by reference.

TECHNICAL FIELD

The present disclosure relates to a resource allocation method and a resource management apparatus for performing the same.

BACKGROUND ART

When a transmitter transmits data in a transmission control protocol (TCP) layer, data is transmitted through hybrid automatic retransmit request (HARQ). When an error is generated in the HARQ step, the transmitter receives feedback of TCP ACK/NACK in the TCP layer and retransmits the data.

In typical data transmission, HARQ data is transmitted while maintaining a block error rate (BLER) of 10%. When a data transmission error is generated, the transmitter retransmits through HARQ retransmission and a receiver recovers an error by combining previously received data and the retransmitted data. As described, a typical data transmission scheme sends an appropriate amount of redundancy data and retransmits data upon the generation of a data transmission error rather than unconditionally transmitting a large amount of redundancy data for successful transmission.

TCP transmission performs flow control on the basis of a sliding window that enables forward data transmission only when ACK/NACK is received from the receiver. However, when the BLER of HARQ transmission is set to 10%, HARQ retransmission may occur twice or three times for a certain packet. If a TCP ACK/NACK packet is retransmitted twice or three times in the HARQ step, the transmitter waits for transmission of next data until the TCP ACK/NACK packet is received, resulting in transmission rate decrease. Specifically, if retransmission occurs twice or three times when HARQ RTT (Round Trip Time) is about 8 ms in LTE (Long Term Evolution), TCP ACK information is transmitted with a delay of about 16 to 24 ms.

The above information disclosed in this Background section is only for enhancement of understanding of the background of the disclosure and therefore it may contain information that does not form the prior art that is already known in this country to a person of ordinary skill in the art.

DISCLOSURE

Technical Problem

The present disclosure has been made in an effort to provide a resource allocation method for controlling a BLER by variably allocating resource blocks on the basis of load information about a serving base station and a neighbor base station, and a resource management apparatus for performing the same.

Technical Solution

An exemplary embodiment of the present disclosure provides a resource management apparatus for managing a plurality of base stations (BSs). The resource management apparatus may include a load information management unit, a neighbor BS list management unit, and a resource allocation unit. The load information management unit may be configured to manage load information of the plurality of BSs. The neighbor BS list management unit may be configured to manage a neighbor BS list of each BS. The resource allocation unit may be configured to vary the quantity of resources allocated to a target BS from among the plurality of BSs on the basis of load information of the target BS and at least one neighbor BS of the target BS, upon reception of a resource allocation request from the target BS.

The resource allocation unit may allocate a larger quantity of resources than resources associated with a reference block error rate (BLER) to the target BS when load of the neighbor BS is less than a reference value.

The resource allocation unit may allocate resources to the target BS such that data is transmitted at a lower BLER than the reference BLER between the target BS and a terminal when the load of the neighbor BS is less than the reference value.

The resource allocation unit may allocate the resources associated with the reference BLER to the target BS when the load of the neighbor BS is higher than the reference value.

In the resource management apparatus, when a terminal is connected to the target BS, the resource allocation unit may allocate resources such that HARQ (Hybrid Automatic Retransmit request) ACK/NACK data transmitted between the arbitrary BS and the terminal is transmitted at a lower BLER than the reference BLER when the load of the neighbor BS is less than the reference value.

The resource allocation unit may vary a modulation and coding scheme (MCS) for allocating resources to the target BS on the basis of load information of the target BS and neighbor BSs of the target BS.

Another exemplary embodiment of the present disclosure provides a method for allocating, by a resource management apparatus, resources to a serving BS to which a terminal is connected, the method including: determining whether a load of the serving BS is less than a first reference value; searching neighbor BSs of the serving BS when the load of the serving BS is less than the first reference value; determining whether loads of the neighbor BSs are less than a second reference value; and allocating more resources for the terminal and the serving BS than resources associated with a reference BLER when the loads of the neighbor BSs are less than the second reference value.

The allocating of more resources for the terminal and the serving BS than the resources associated with the reference BLER may include allocating resources to transmit data at a lower BLER than the reference BLER between the serving BS and the terminal.

The allocating of more resources for the terminal and the serving BS than the resources associated with the reference BLER may include allocating resources to transmit HARQ ACK/NACK data between the serving BS and the terminal at a lower BLER than the reference BLER.

The method may further include allocating the resources associated with the reference BLER to the serving BS when the loads of the neighbor BSs are higher than the second reference value.

The method may further include allocating the resources associated with the reference BLER to the serving BS when the load of the serving BS is higher than the first reference value.

The searching of the neighbor BSs of the serving BS may include searching the neighbor BSs on the basis of a neighbor BS list of the serving BS.

The load of the serving BS and the loads of the neighbor BSs may be uplink loads.

The load of the serving BS and the loads of the neighbor BSs may be downlink loads.

Another exemplary embodiment of the present disclosure provides a method for allocating, by a resource management apparatus, resources for HARQ ACK/NACK data transmitted between a terminal and a serving BS, the method including: searching neighbor BSs of the serving BS; determining whether loads of the neighbor BSs are less than a reference value in a transmission direction of the ACK/NACK data; setting a BLER of the terminal and the serving BS to lower than a reference BLER when the loads of the neighbor BSs are less than the reference value; and allocating resources for the ACK/NACK data on the basis of the set BLER.

The determining of whether the loads of the neighbor BSs are less than the reference value may include determining whether uplink loads of the neighbor BSs are less than a reference value when the terminal downloads data on downlink and determining whether downlink loads of the neighbor BSs are less than a reference value when the terminal uploads data on uplink.

The allocating of the resources for the ACK/NACK data may include allocating more resources than resources associated with the reference BLER.

The allocating of the resources for the ACK/NACK data may include changing a first MCS related to the reference BLER to a second MCS and allocating the resources for the ACK/NACK data.

Advantageous Effects

According to an exemplary embodiment of the present disclosure, the BLER is reduced by allocating more resource blocks when the load of the neighbor block is lower than the reference value, and thus HARQ retransmission is not needed. Therefore, rapid data transmission can be achieved according to an exemplary embodiment of the present disclosure.

MODE FOR INVENTION

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

In the specification, "terminal" may refer to a mobile station (MS), a mobile terminal (MT), a subscriber station (SS), a portable subscriber station (PSS), user equipment (UE), an access terminal (AT), and the like, and may include all or some functions of the mobile terminal, subscriber station, portable subscriber station, user equipment, access terminal, and the like.

In the specification, "base station (BS)" may refer to an access point (AP), a radio access station (RAS), a NodeB, an evolved NodeB (eNodeB), a base transceiver station (BTS), a mobile multihop relay (MMR)-BS, and the like, and may include all or some functions of the access point, radio access station, Node B, eNodeB, base transceiver, MMR-BS, and the like.

A description will be given of a resource allocation method and a resource management apparatus for performing the same according to embodiments of the present disclosure with reference to the accompanying drawings.

Figure 1:
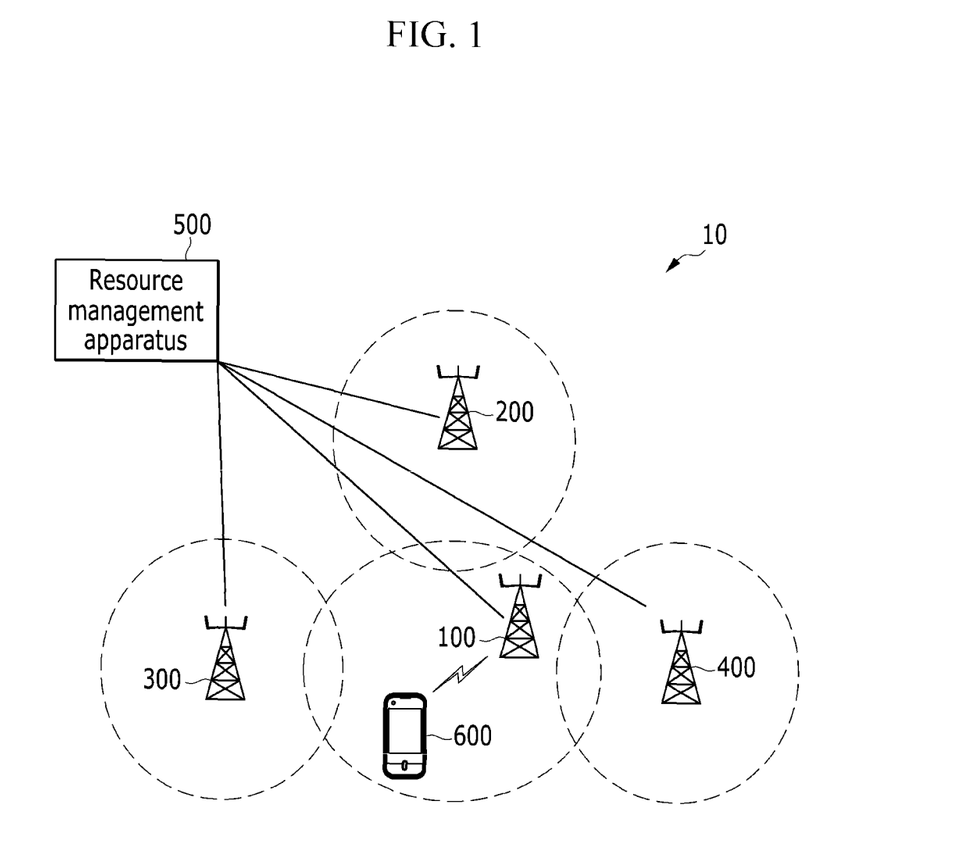
FIG. 1 illustrates a network system according to an exemplary embodiment of the present disclosure.

FIG. 1 illustrates a network system according to an exemplary embodiment of the present disclosure.

Referring to FIG. 1, a network system 10 includes a plurality of BSs (e.g., 100, 200, 300, and 400), a resource management apparatus 500, and a terminal 600. The terminal 600 is connected to the BS 100 to communicate through a communication network. Here, the BS 100 is a serving BS and the other BSs (e.g., 200, 300, and 400) are neighbor BSs of the BS 100.

The resource management apparatus 500 integrally manages resource blocks (RBs) and load information of the BSs 100 to 400 through a communication network. In addition, the resource management apparatus 500 is connected to the BSs 100 to 400 and allocates resource blocks to the serving BS 100 on the basis of collected load information of the neighbor BSs 200, 300, and 400. Here, the resource management apparatus 500 determines the quantity of resource blocks and a modulation and coding scheme (MCS). To this end, the resource management apparatus 500 manages a list of neighbor BSs of a certain BS, that is, a neighbor list. In addition, the resource management apparatus 500 uses load information of the BSs 200, 300, and 400 registered in a list of neighbor BSs of the serving BS 100. The resource management apparatus 500 may collect load information from each BS through a communication network.

That is, when the neighbor BSs 200, 300, and 400 have small loads since the neighbor BSs 200, 300, and 400 have intermittent traffic, the resource management apparatus 500 allocates a comparatively larger amount of resource blocks to the serving BS 100. For example, when the terminal 600 downloads (e.g., full downlink loads) data over a downlink, the resource management apparatus 500 allocates a comparatively larger quantity of resources to an uplink of the terminal 600 through stable MCS of quadrature phase shift keying (QPSK). Accordingly, the BLER is reduced and thus the terminal 600 can immediately transmit TCP ACK/NACK over uplink without HARQ (e.g., Hybrid ARQ) retransmission.

When the resource management apparatus 500 allocates a large amount of resources all the time, the influence of interference applied to a neighbor cell increases when data is transmitted between the serving BS 100 and the terminal 600. Accordingly, the resource management apparatus 500 allocates a comparatively larger amount of resources to the serving BS 100 and the terminal 600 when large uplink or downlink traffic is not generated in the neighbor cell.

Figure 2:
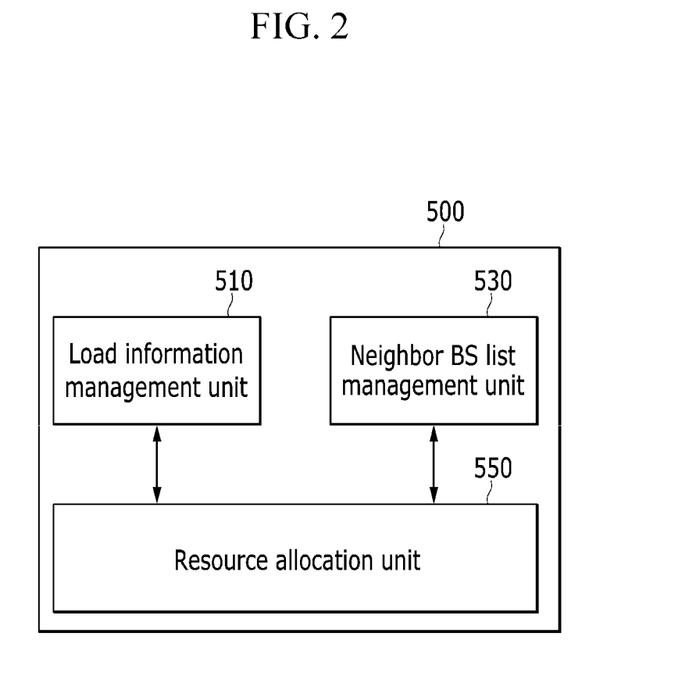
FIG. 2 is a block diagram of a resource management apparatus according to an exemplary embodiment of the present disclosure.

FIG. 2 is a block diagram of the resource management apparatus according to an exemplary embodiment of the present disclosure.

Referring to FIG. 2, the resource management apparatus 500 includes a load information management unit 510, a neighbor BS list management unit 530, and a resource allocation unit 550.

The load information management unit 510 collects load information of BSs 100 to 400 through a communication network and manages the collected load information of BSs 100 to 400 stored in a memory of the resource management apparatus 500.

The neighbor BS list management unit 530 obtains a neighbor BS list per each BS and manages the obtained neighbor BS list per each BS.

The resource allocation unit 550 receives a resource allocation request from the service BS 100 through a communication network. The resource allocation unit 550 differently determines or varies quantity of resources to be allocated to the serving BS 100 based on load information of the neighbor BSs 200, 300, and 400 upon the reception of the resource allocation request from the serving BS 100. The resource allocation unit 550 may also dynamically change the MCS. To this end, the resource allocation unit 550 obtains a neighbor BS list of the serving BS 100 from the neighbor BS list management unit 530. In addition, the resource allocation unit 550 acquires load information of the neighbor BSs 200, 300, and 400 from the load information management unit 510.

The resource allocation unit 550 compares the loads of the neighbor BSs 200, 300, and 400 with a reference value. When the resource allocation unit 550 determines that loads of the neighbor BSs 200, 300, and 400 are less than a reference value, the resource allocation unit 550 allocates a larger quantity of resources than resources associated with a reference BLER for data transmission between the terminal 600 and the serving BS 100. That is, the resource allocation unit 550 allocates uplink/downlink resources between the terminal 600 and the serving BS 100 such that a lower BLER than the reference BLER is maintained.

Figure 3:
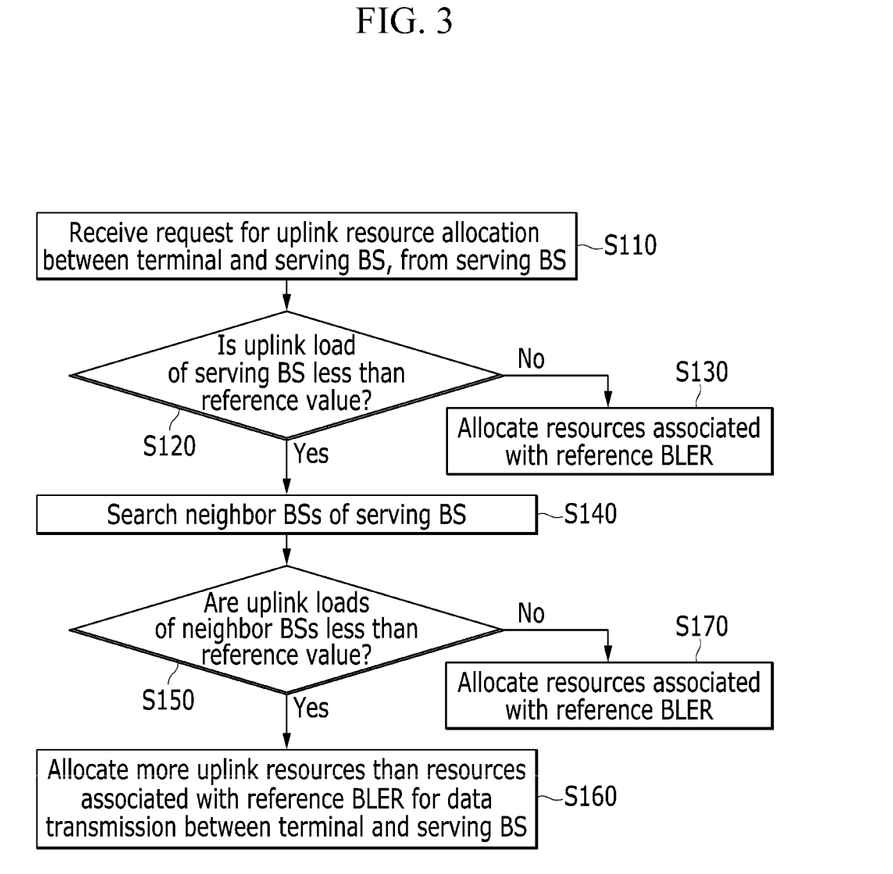
FIG. 3 is a flowchart illustrating an uplink resource allocation method according to an exemplary embodiment of the present disclosure.

FIG. 3 is a flowchart illustrating an uplink resource allocation method according to an exemplary embodiment of the present disclosure.

Referring to FIG. 3, the serving BS 100 transmits a request to the resource management apparatus 500 for requesting that the resource management apparatus 500 allocates uplink resources between the terminal 600 and the serving BS 100 and the resource management apparatus 500 receives the request from the service 100 (S110).

The resource management apparatus 500 determines whether an uplink load of the serving BS 100 is less than a reference value (S120). That is, the resource management apparatus 500 determines the uplink load of the serving BS 100 in order to allocate a comparatively larger quantity of resources than a reference level to the serving BS 100 when the serving BS 100 has available capacity.

The resource management apparatus 500 compares the uplink load of the serving BS100 with the reference value. When the uplink load of the serving BS 100 is higher than the reference value, the resource management apparatus 500 allocates resources associated with a reference BLER (S130). For example, the reference BLER may be about 10%.

When the uplink load of the serving BS 100 is less than the reference value, the resource management apparatus 500 obtains information on the neighbor BSs 200, 300, and 400 of the serving BS 100 (S140). The resource management apparatus 500 may search the neighbor BSs 200, 300, and 400 of the serving BS 100 on the basis of a managed neighbor BS list. The resource management apparatus 500 may select BSs using the same frequency band as that of the service BS 100 from the managed neighbor BS list and determine the selected BSs as the neighbor BSs.

The resource management apparatus 500 compares uplink loads of the neighbor BSs 200, 300, and 400 with a reference value and determines whether uplink loads of the neighbor BSs 200, 300, and 400 are less than the reference value (S150). Here, the resource management apparatus 500 can consider loads of the neighbor BSs 200, 300, and 400 in various manners according to determination methods. For example, the resource management apparatus 500 can consider a total load amount of the neighbor BSs. Alternatively, the resource management apparatus 500 can consider a load of each neighbor BS.

When loads of the neighbor BSs 200, 300, and 400 are less than the reference value, the resource management apparatus 500 allocates a larger quantity of uplink resources than resources associated with the reference BLER for data transmission between the terminal 600 and the serving BS (S160). That is, the resource management apparatus 500 controls and allocates uplink resources between the terminal 600 and the serving BS 100 to maintain a BLER lower than the reference BLER. For example, the resource management apparatus 500 may allocate resources for maintaining a BLER as 0 in the physical layer.

When the loads of the neighbor BSs 200, 300, and 400 are higher than the reference value, the resource management apparatus 500 allocates the resources associated with the reference BLER (S170). That is, the resource management apparatus 500 transmits data using an MCS for efficiently transmitting data through optimum resources rather than transmitting data using a large quantity of resources, for example, 16-QAM.

The resource management apparatus 500 can allocate downlink resources in the same manner as in uplink resource allocation.

Figure 4:
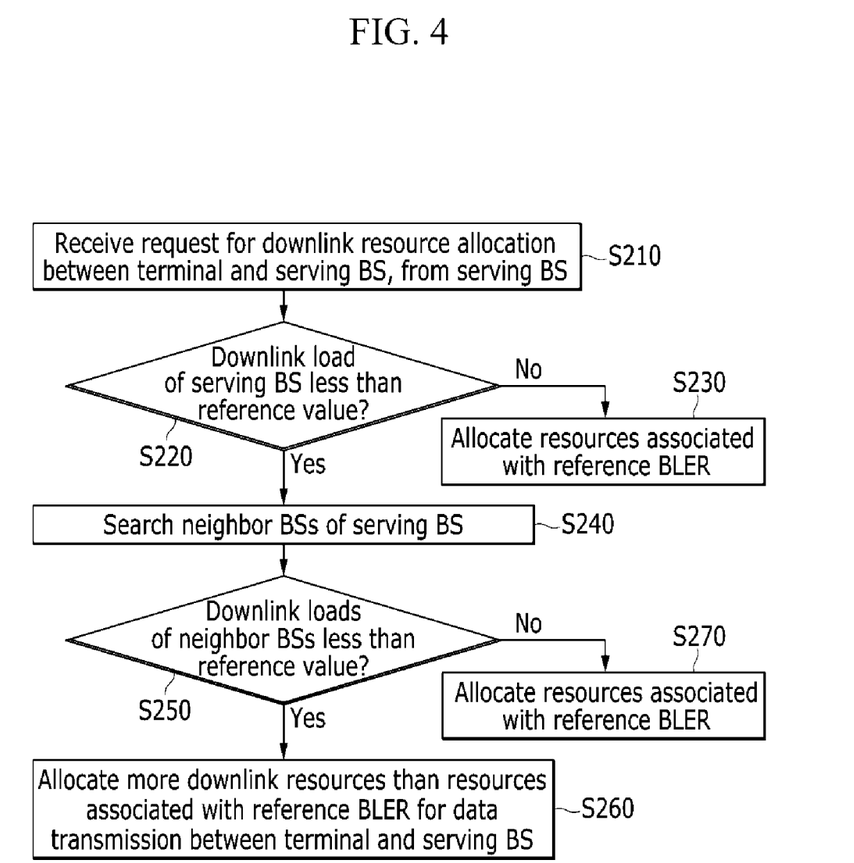
FIG. 4 is a flowchart illustrating a downlink resource allocation method according to an exemplary embodiment of the present disclosure.

FIG. 4 is a flowchart illustrating a downlink resource allocation method according to an exemplary embodiment of the present disclosure.

Referring to FIG. 4, the serving BS 100 transmits a request to the resource management apparatus 500 and requests the resource management apparatus 500 to allocate downlink resources between the terminal 600 and the serving BS 100 (S210).

The resource management apparatus 500 determines whether a downlink load of the serving BS 100 is less than a reference value (S220).

When the downlink load of the serving BS 100 is higher than the reference value, the resource management apparatus 500 allocates resources associated with a reference BLER (S230).

When the downlink load of the serving BS 100 is less than the reference value, the resource management apparatus 500 searches the neighbor BSs 200, 300, and 400 of the serving BS 100 (S240).

The resource management apparatus 500 determines whether downlink loads of the neighbor BSs 200, 300, and 400 are less than a reference value (S250).

When the downlink loads of the neighbor BSs 200, 300, and 400 are less than the reference value, the resource management apparatus 500 allocates a larger quantity of downlink resources than resources associated with the reference BLER for data transmission between the terminal 600 and the serving BS (S260).

When the downlink loads of the neighbor BSs 200, 300, and 400 are higher than the reference value, the resource management apparatus 500 allocates the resources associated with the reference BLER (S270).

Figure 5:
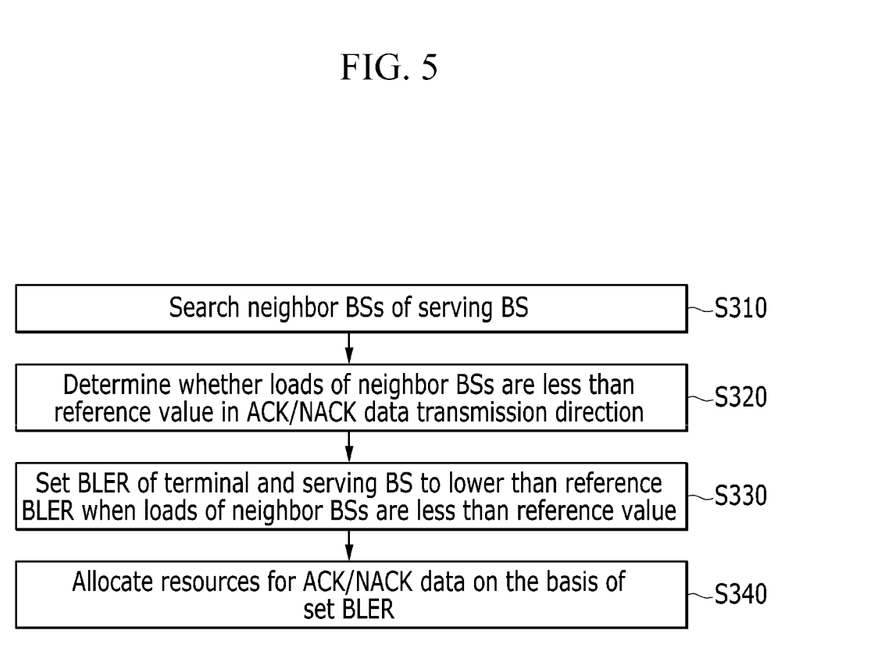
FIG. 5 is a flowchart illustrating a resource allocation method according to another exemplary embodiment of the present disclosure.

FIG. 5 is a flowchart illustrating a resource allocation method according to another exemplary embodiment of the present disclosure.

Referring to FIG. 5, the resource management apparatus 500 allocates resources for HARQ ACK/NACK data transmitted between the terminal 600 and the serving BS 100.

The resource management apparatus 500 searches the neighbor BSs 200, 300, and 400 of the serving BS 100 (S310).

The resource management apparatus 500 determines whether loads of the neighbor BSs 200, 300, and 400 are less than the reference value in an ACK/NACK data transmission direction (S320). Here, the ACK/NACK data transmission direction may be an uplink direction or a downlink direction. When the terminal 600 downloads data on the downlink, the resource management apparatus 500 determines whether uplink loads of the neighbor BSs are less than the reference value. When the terminal 600 uploads data on the uplink, the resource management apparatus 500 determines whether downlink loads of the neighbor BSs are less than the reference value.

When the loads of the neighbor BSs are less than the reference value, the resource management apparatus 500 sets a BLER of the terminal 600 and the serving BS 100 to be lower than a reference BLER (S330). For example, the resource management apparatus 500 may set the BLER of the terminal 600 and the serving BS 100 to a value close to 0.

The resource management apparatus 500 allocates resources for ACK/NACK data on the basis of the set BLER (S340). The resource management apparatus 500 allocates a larger quantity of resources than resources associated with the reference BLER.

When the loads of the neighbor BSs 200, 300, and 400 are less than the reference value, as described above, the resource management apparatus 500 allocates a larger quantity of uplink/downlink resources for data transmitted between the serving BS 100 and the terminal 600 such that the data is transmitted at a lower BLER than the reference BLER. Accordingly, the terminal 600 and the serving BS 100 immediately transmit HARQ data, for example, HARQ ACK/NACK on uplink/downlink without retransmission. Consequently, the terminal 600 and the serving BS 100 move in the transmission sliding window without waiting for HARQ ACK/NACK retransmission. Accordingly, the terminal 600 and the serving BS 100 can rapidly transmit and receive data.

In addition, when loads of the neighbor BSs 200, 300, and 400 are not large, more uplink/downlink resources are allocated for data transmission between the serving BS 100 and the terminal 600. Even when more uplink/downlink resources are allocated for data transmission between the serving BS 100 and the terminal 100, interference applied to the neighbor BSs 200, 300, and 400 is insignificant.

The aforementioned exemplary embodiments of the present disclosure are not implemented only through a device (e.g., a computing system including a processor, a memory, and a communication circuit) and a method, and may be implemented through a program that executes functions corresponding to components of the exemplary embodiments of the present disclosure or a recording medium storing the program.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

The invention claimed is:

1. A resource management apparatus for managing a plurality of base stations (BSs), comprising:
   a load information management unit configured to manage load information of the plurality of BSs;
   a neighbor BS list management unit configured to manage a neighbor BS list of each BS; and
   a resource allocation unit configured to vary quantity of resources to be allocated to a target BS based on load information of the target BS and at least one neighbor BS of the target BS, upon reception of a resource allocation request from the target BS,
   wherein when a terminal is connected to the target BS, the resource allocation unit allocates resources to transmit HARQ (Hybrid Automatic Retransmit request) ACK/NACK data between the target BS and the terminal at a lower block error rate (BLER) than a reference BLER when the load of the neighbor BS is less than a reference value.

2. The resource management apparatus of claim 1, wherein the resource allocation unit allocates a larger quantity of resources than resources associated with the reference BLER to the target BS when load of the neighbor BS is less than the reference value.

3. The resource management apparatus of claim 2, wherein the resource allocation unit allocates resources to the target BS to transmit data at a lower BLER than the reference BLER between the target BS and the terminal when the load of the neighbor BS is less than the reference value.

4. The resource management apparatus of claim 2, wherein the resource allocation unit allocates the resources associated with the reference BLER to the target BS when the load of the neighbor BS is higher than the reference value.

5. The resource management apparatus of claim 1, wherein the resource allocation unit varies a modulation and coding scheme (MCS) for allocating resources to the target BS based on load information of the target BS and neighbor BSs of the target BS.

6. A method for allocating, by a resource management apparatus, resources to a serving BS to which a terminal is connected, the method comprising:
    determining whether a load of the serving BS is less than a first reference value;
    searching neighbor BSs of the serving BS when the load of the serving BS is less than the first reference value;
    determining whether loads of the neighbor BSs are less than a second reference value; and
    allocating more resources for the terminal and the serving BS than resources associated with a reference BLER when the loads of the neighbor BSs are less than the second reference value,
    wherein the allocating of more resources for the terminal and the serving BS than the resources associated with the reference BLER comprises allocating resources to transmit HARQ ACK/NACK data between the serving BS and the terminal at a lower BLER than the reference BLER.

7. The method of claim 6, wherein the allocating of more resources for the terminal and the serving BS than the resources associated with the reference BLER comprises allocating resources to transmit data at a lower BLER than the reference BLER between the serving BS and the terminal.

8. The method of claim 6, further comprising allocating the resources associated with the reference BLER to the serving BS when the loads of the neighbor BSs are higher than the second reference value.

9. The method of claim 6, further comprising allocating the resources associated with the reference BLER to the serving BS when the load of the serving BS is higher than the first reference value.

10. The method of claim 6, wherein the searching of the neighbor BSs of the serving BS comprises searching the neighbor BSs based on a neighbor BS list of the serving BS.

11. The method of claim 6, wherein the load of the serving BS and the loads of the neighbor BSs are uplink loads.

12. The method of claim 6, wherein the load of the serving BS and the loads of the neighbor BSs are downlink loads.

13. A method for allocating, by a resource management apparatus, resources for hybrid automatic retransmit request (HARQ) ACK/NACK data transmitted between a terminal and a serving base station (BS), the method comprising:
    searching neighbor BSs of the serving BS;
    determining whether loads of the neighbor BSs are less than a reference value in a transmission direction of the ACK/NACK data;
    setting a block error rate (BLER) of the terminal and the serving BS to be lower than a reference BLER when the loads of the neighbor BSs are less than the reference value; and
    allocating resources for the ACK/NACK data based on the set BLER.

14. The method of claim 13, wherein the determining of whether the loads of the neighbor BSs are less than the reference value comprises:
    determining whether uplink loads of the neighbor BSs are less than the reference value when the terminal downloads data on downlink; and
    determining whether downlink loads of the neighbor BSs are less than the reference value when the terminal uploads data on uplink.

15. The method of claim 13, wherein the allocating of the resources for the ACK/NACK data comprises allocating more resources than resources associated with the reference BLER.

16. The method of claim 13, wherein the allocating of the resources for the ACK/NACK data comprises:
    changing a first MCS related to the reference BLER to a second MCS; and
    allocating the resources for the ACK/NACK data.

* * * * *